US012627081B2

(12) United States Patent
Mellott

(10) Patent No.: US 12,627,081 B2
(45) Date of Patent: May 12, 2026

(54) ELECTRICAL CONNECTOR WITH COATING PIERCING ELECTRICAL CONTACT

(71) Applicant: Aptiv Technologies AG, Schaffhausen (CH)

(72) Inventor: Michael L. Mellott, Youngstown, OH (US)

(73) Assignee: Aptiv Technologies AG, Schaffhausen (CH)

( * ) Notice: Subject to any disclaimer, the term of this patent is extended or adjusted under 35 U.S.C. 154(b) by 628 days.

(21) Appl. No.: 18/111,166

(22) Filed: Feb. 17, 2023

(65) Prior Publication Data

US 2023/0282990 A1 Sep. 7, 2023

Related U.S. Application Data

(60) Provisional application No. 63/317,150, filed on Mar. 7, 2022.

(51) Int. Cl.
*H01R 4/2495* (2018.01)
*H01R 4/2407* (2018.01)

(52) U.S. Cl.
CPC ......... *H01R 4/2495* (2013.01); *H01R 4/2407* (2018.01)

(58) Field of Classification Search
CPC ........................... H01R 4/2495; H01R 4/2407; H01R 13/6596; H01R 43/16; H01R 4/203; H01R 4/64; H01R 43/048; H01R 43/01
See application file for complete search history.

(56) References Cited

U.S. PATENT DOCUMENTS

| | | | | | |
|---|---|---|---|---|---|
| 3,934,075 | A * | 1/1976 | Dilliplane | H01R 4/2495 | 333/260 |
| 4,082,402 | A * | 4/1978 | Kinkaid | H01R 4/2495 | 439/877 |
| 4,263,474 | A * | 4/1981 | Tennant | H01R 12/67 | 439/422 |
| 4,498,715 | A * | 2/1985 | Peppler | H01R 12/775 | 439/95 |
| 4,560,224 | A * | 12/1985 | Weisenburger | H01R 4/2495 | 439/877 |
| 5,658,163 | A * | 8/1997 | DeRoss | H01R 4/2495 | 174/84 C |
| 6,123,570 | A * | 9/2000 | Hwang | H01R 12/675 | 439/456 |
| 6,267,618 | B1 * | 7/2001 | Hio | H01R 12/68 | 439/422 |
| 6,394,836 | B2 * | 5/2002 | Nagai | H01R 12/68 | 439/877 |
| 6,439,921 | B1 * | 8/2002 | Hio | H01R 12/68 | 439/422 |

(Continued)

*Primary Examiner* — Edwin A. Leon
(74) *Attorney, Agent, or Firm* — Billion & Armitage

(57) ABSTRACT

An electrical connector assembly includes a generally planar metallic substrate having a surface with an electrically nonconductive coating and an electrical connector having a contact tab extending therefrom that is in mechanical and electrical contact with the metallic substrate. The contact tab defines two sharp points that are formed by two triangular portions of the contact tab that pierce the electrically non-conductive coating. An electrical shield incorporating the contact tab and a method of forming the electrical shield are also provided herein.

16 Claims, 6 Drawing Sheets

(56) References Cited

U.S. PATENT DOCUMENTS

| | | | | |
|---|---|---|---|---|
| 7,329,141 | B2 * | 2/2008 | Kumakura | H01R 12/594<br>439/425 |
| 7,410,384 | B2 * | 8/2008 | Shuey | H01R 12/68<br>439/421 |
| 2003/0008548 | A1 * | 1/2003 | Ueda | H01R 4/2495<br>439/422 |
| 2024/0204427 | A1 * | 6/2024 | Rhein | H01R 13/6596 |

* cited by examiner

ELECTRICAL CONNECTOR WITH COATING PIERCING ELECTRICAL CONTACT

CROSS-REFERENCE TO RELATED APPLICATION

This application claims benefit of priority to U.S. Provisional Application No. 63/317,150 filed on Mar. 7, 2022, the entire disclosure of which is hereby incorporated by reference.

FIELD OF THE INVENTION

This disclosure is directed to an electrical connector having an electrical contact configured to pierce through an electrically nonconductive coating on a metallic substrate and establish an electrical connection with the metallic substrate.

BACKGROUND

Electric vehicle manufacturers typically utilize electrocoated sheet metal for high voltage battery cases. Electrocoating is a tough non-conductive paint that prevents corrosion. It is difficult to pierce through the electrocoating to make electrical contact with the conductive sheet metal substrate. Prior contact designs are limited in focusing the high forces necessary to scratch through or pierce the electrocoating. These contacts 100, 200, as shown in FIG. 1 and FIG. 2, typically have a single sharp point 102, 202 on each contact feature 104, 204. The high clamping force and resulting unbalanced lateral forces cause these contacts 100, 200 to shift in a direction that is opposite of the intended scraping direction, thereby reducing or negating the scraping force applied by the sharp point 102, 202 and reducing the effectiveness of the contact 100, 200 to pierce the electrocoating.

BRIEF SUMMARY

According to one or more aspects of the present disclosure, an electrical connector assembly includes a generally planar metallic substrate having a surface with an electrically nonconductive coating and an electrical connector having a contact tab extending therefrom that is in mechanical and electrical contact with the metallic substrate. The contact tab defines two sharp points formed by two triangular portions of the contact tab that pierce the electrically nonconductive coating.

In some aspects of the electrical connector assembly according to the previous paragraph, the two sharp points are formed by two triangular portions arranged at an oblique angle to each other.

In some aspects of the electrical connector assembly according to any one of the previous paragraphs, the two triangular portions are arranged symmetrically about a centerline of the contact tab.

In some aspects of the electrical connector assembly according to any one of the previous paragraphs, the two triangular portions are formed by a V-shaped fold in the contact tab.

In some aspects of the electrical connector assembly according to any one of the previous paragraphs, the electrical connector assembly further includes a connector body attached to the metallic substrate and in contact with an apex of the V-shaped fold in the contact tab.

In some aspects of the electrical connector assembly according to any one of the previous paragraphs, a clamping force applied to the apex of the V-shaped fold in the contact tab causes the two sharp points formed by two triangular portions of the contact tab to move away from one another.

In some aspects of the electrical connector assembly according to any one of the previous paragraphs, a clamping force applied to the apex of the V-shaped fold in the contact tab causes the two sharp points formed by two triangular portions of the contact tab to move an equal distance from a centerline of the contact tab.

In some aspects of the electrical connector assembly according to any one of the previous paragraphs, the two triangular portions are non-coplanar.

In some aspects of the electrical connector assembly according to any one of the previous paragraphs, a contact force applied to the contact tab is evenly distributed to each of the two sharp points.

According to one or more aspects of the present disclosure, an electrical shield formed of sheet metal includes a contact tab extending from the electrical shield and integrally formed of the sheet metal with the electrical shield. The contact tab defines two sharp points formed by two triangular portions of the contact tab that are configured to pierce an electrically nonconductive coating on a metallic substrate.

In some aspects of the electrical shield according to the previous paragraph, the two sharp points are formed by two triangular portions arranged at an oblique angle to each other.

In some aspects of the electrical shield according to any one of the previous paragraphs, the two triangular portions are arranged symmetrically about a centerline of the contact tab.

In some aspects of the electrical shield according to any one of the previous paragraphs, two triangular portions are formed by a V-shaped fold in the contact tab.

In some aspects of the electrical shield according to any one of the previous paragraphs, two triangular portions are non-coplanar.

In some aspects of the electrical shield according to any one of the previous paragraphs, a contact force applied to the contact tab is evenly distributed to each of the two sharp points.

According to one or more aspects of the present disclosure, a method of forming an electrical shield from sheet metal includes the steps of:

- forming a rectangular contact tab extending from the electrical shield and integral to the electrical shield; and
- bending the contact tab at a centerline such that the contact tab defines two equal triangular portions having sharp points at vertices of the two triangular portions. The two sharp points are configured pierce an electrically nonconductive coating on a metallic substrate.

In some aspects of the method according to the previous paragraph, the two sharp points are formed by two triangular portions arranged at an oblique angle to each other.

In some aspects of the method according to any one of the previous paragraphs, the two triangular portions are arranged symmetrically about a centerline of the contact tab.

In some aspects of the method according to any one of the previous paragraphs, the two triangular portions are formed by a V-shaped fold in the contact tab.

In some aspects of the method according to any one of the previous paragraphs, the two triangular portions are non-coplanar.

DESCRIPTION OF THE DRAWINGS

The present invention will now be described by way of example with reference to the accompanying drawings, in which.

DETAILED DESCRIPTION

Figure 1:
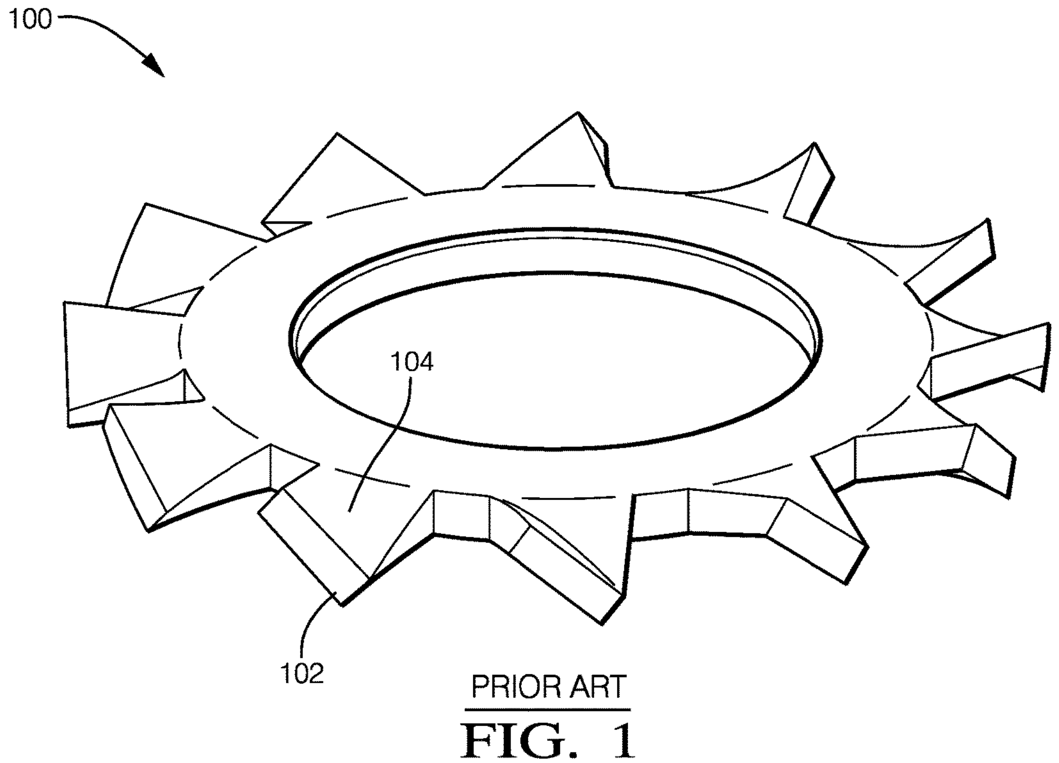
PRIOR ART FIG. 1
FIG. 1 illustrates a piercing contact according to the prior art.
Figure 2:
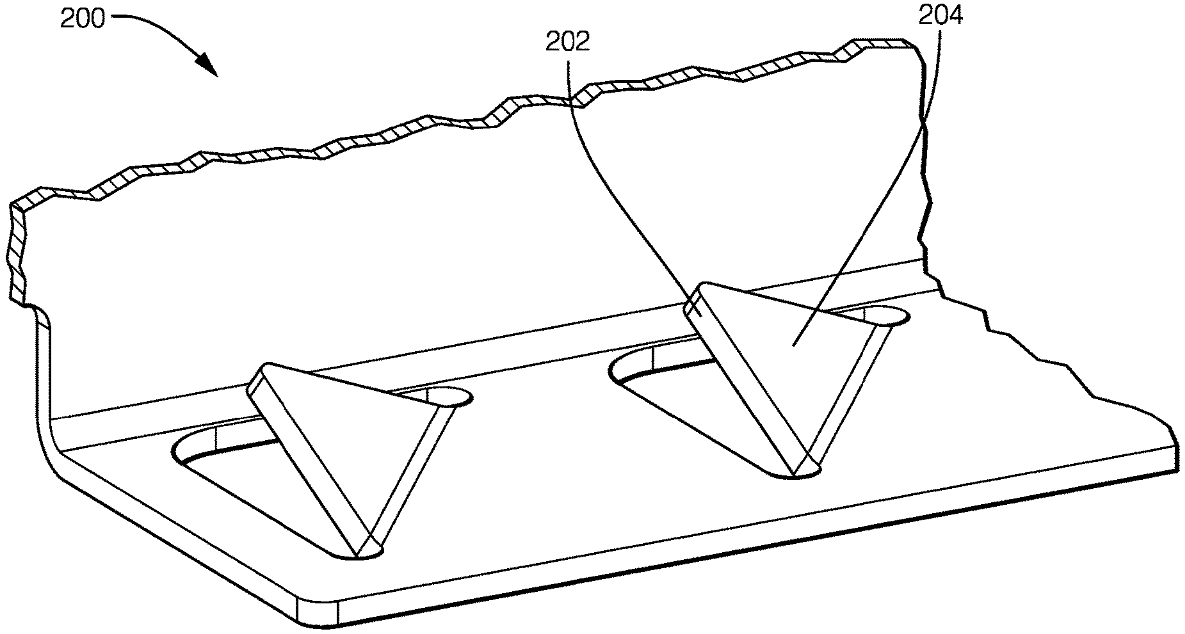
PRIOR ART FIG. 2
FIG. 2 illustrates another piercing contact according to the prior art.
Figure 3:
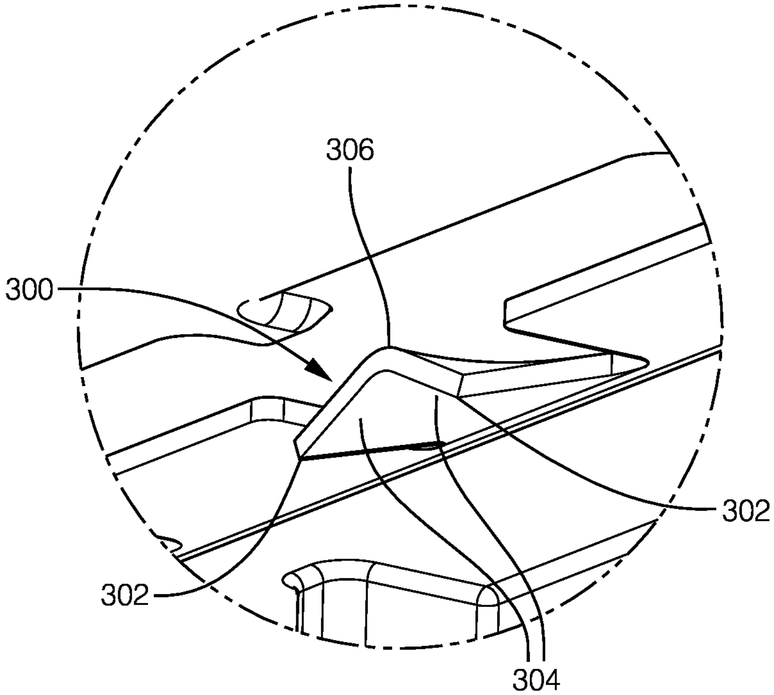
FIG. 3 illustrates an isometric view of a piercing contact according to some of the embodiments.
Figure 4:
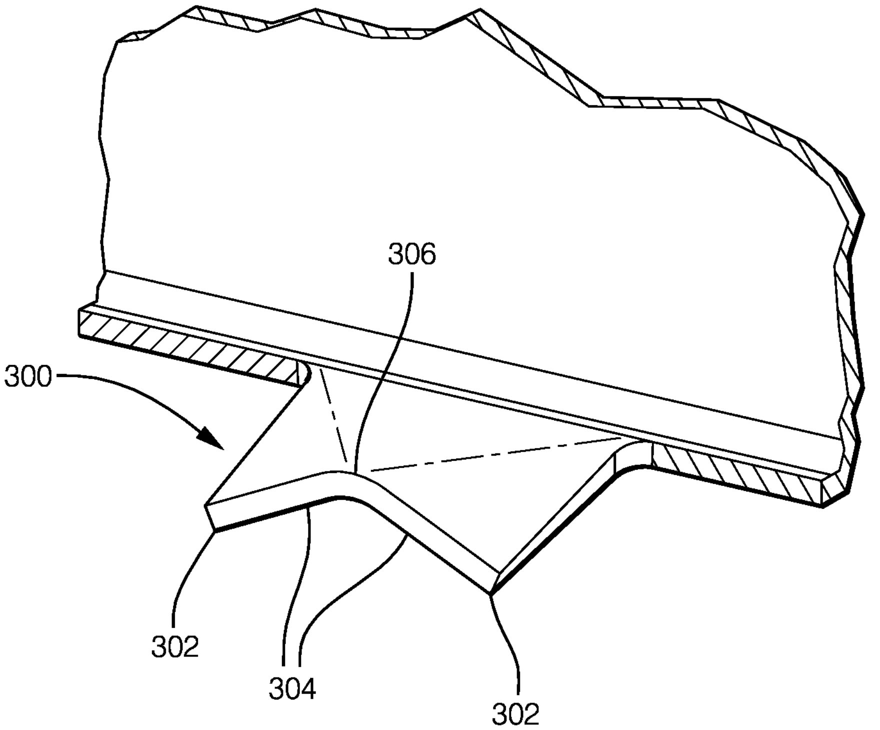
FIG. 4 illustrates an alternative isometric view of the piercing contact of FIG. 3 according to some of the embodiment.
Figure 5A:
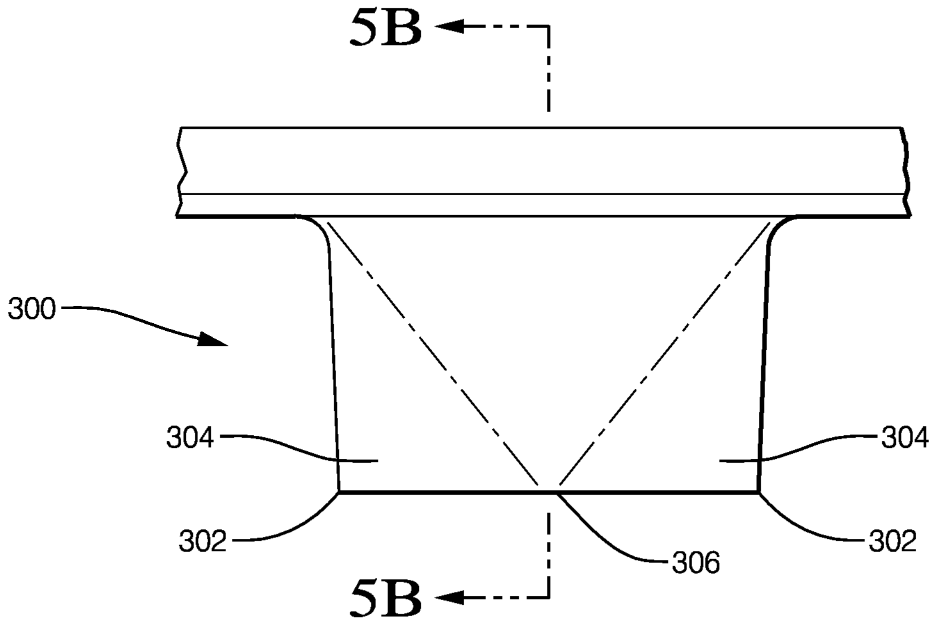
FIG. 5A illustrates a front view of the piercing contact of FIG. 3 according to some of the embodiments.
Figure 5B:
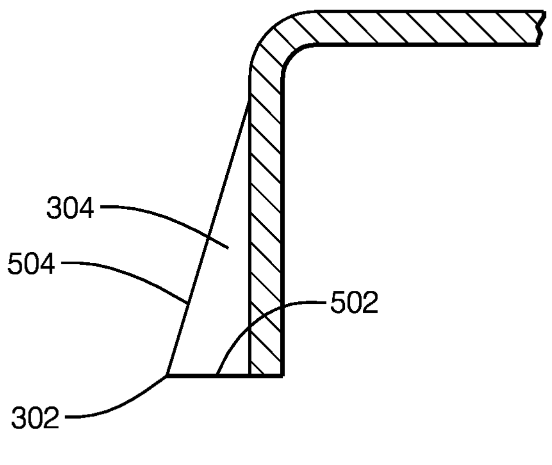
FIG. 5B illustrates a cross section view of the piercing contact of FIG. 3 along the section line 5B-5B of FIG. 5A according to some embodiments.

A non-limiting example of a piercing electrical contact that is configured to penetrate an electrically nonconductive coating, e.g., paint, polymer resin, metallic oxides, electrocoating, coating, electropainting, electrophoretic painting, etc., on a metal substrate, such as a battery case of an electric vehicle made of sheet metal, is illustrated in FIGS. 3 through 5B. As shown in FIG. 3 and FIG. 4, the piercing contact, hereinafter referred to as the contact 300, is formed of an electrically conductive material, preferably sheet metal, and has sharp points 302 defined by the tips of two triangular sections 304 of the contact 300. The two triangular sections 304 of the contact 300 may be formed by folding a rectangular tab into a "V" shape along the centerline 306, thereby forming two mirrored triangular section about the centerline 306 of the contact 300 having an oblique angle therebetween. A cross section view of the contact 300 along the centerline 306 of FIG. 5A is shown by FIG. 5B and illustrates that the sharp points 302 are pointed due to the unattached sides 502 504 of the two triangular sections 304 being straight and thereby causing the vertex of the unattached sides 502 504 to come to a sharp point and lack a rounded edge. The sharp points 302 may also be sharp due to sharp edges formed on the two triangular sections 304 when the contact 300 is cut from the sheet metal using a stamping, blanking, or cutting process.

Figure 6:
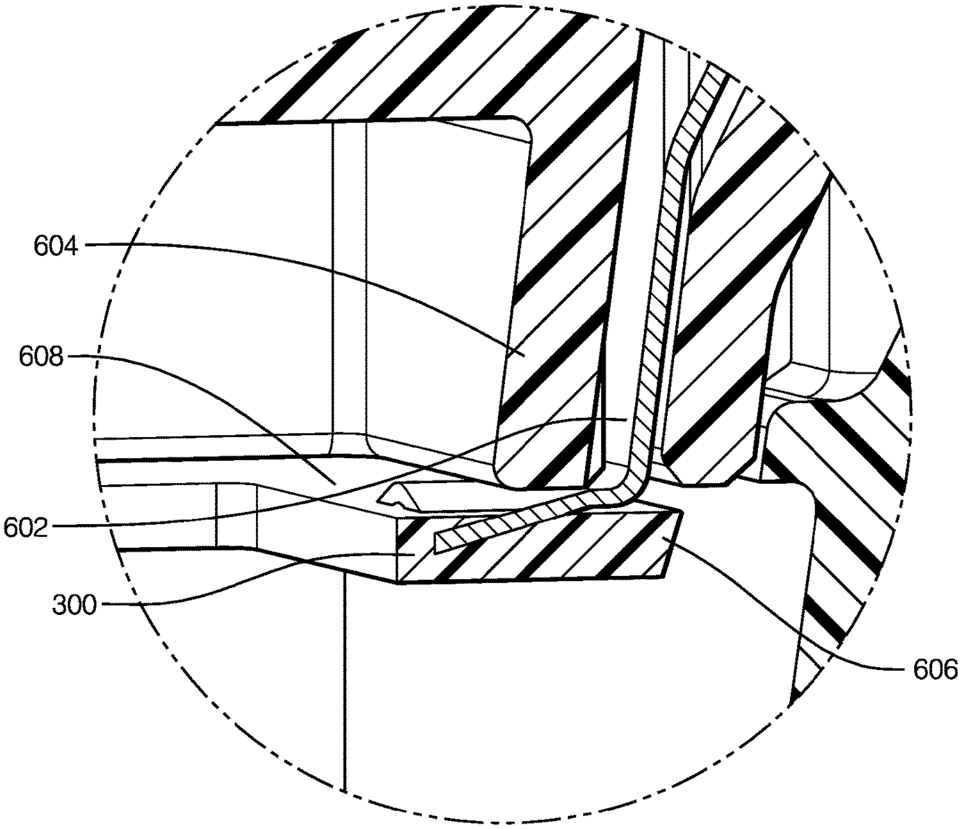
FIG. 6 illustrates the piercing contact of FIG. 3 disposed between a connector header and a metal substrate according to some of the embodiments.

FIG. 6 illustrates the contact 300 extending from an electrical shield 602 within a connector header 604 and being disposed between the connector header 604 and a coated metal substrate 606 having an electrically non-conductive coating 608 disposed on a surface thereof.

Figure 7:
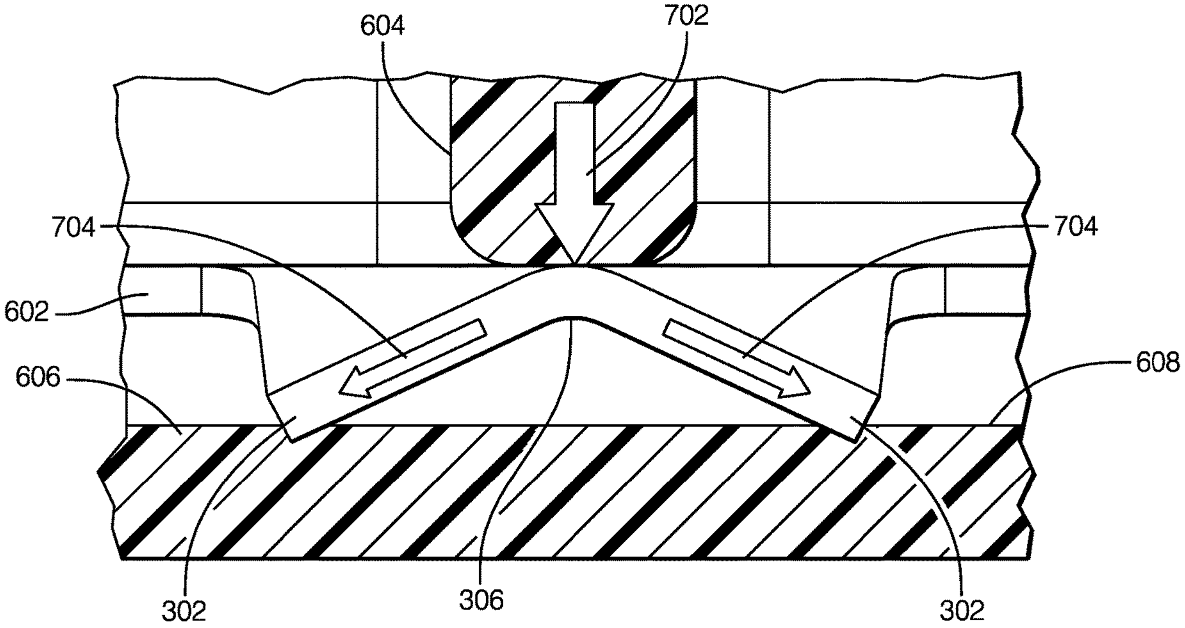
FIG. 7 illustrates a force transfer diagram of the piercing contact of FIG. 3 according to some of the embodiments.

As shown in FIG. 7, a clamping force is applied by the housing to the apex of the contact 300 along the centerline 306, thereby forcing the sharp points 302 against the coated metal substrate 606. The application of the clamping force 702 to the "V" shape of the contact 300 creates equal and opposing outward lateral movement of the two sharp points 302. This produces two separate and balanced opposing scraping forces 704 that force the sharp points 302 to dig into the coated metal substrate 606, thereby piercing through the coating 608 and continuing to scrape until the connector header 604 is seated. This creates a robust electrical connection between the contact 300 and the coated metal substrate 606. Because the scraping forces 704 applied to the sharp points 302 are balanced, shifting of sharp points 302 does not transfer back into the contact 300 and so the application of the clamping force 702 to the contact 300 achieves the desired scraping action. The "V" shape of the contact 300 allows a clamping force 702 applied to the contact 300 to act on the sharp points 302 of that contact 300. The V-shape of the contact 300 forms a high normal force spring that is activated by the clamping forces 702 applied to the piercing contact by the connector header 604.

Figure 8:
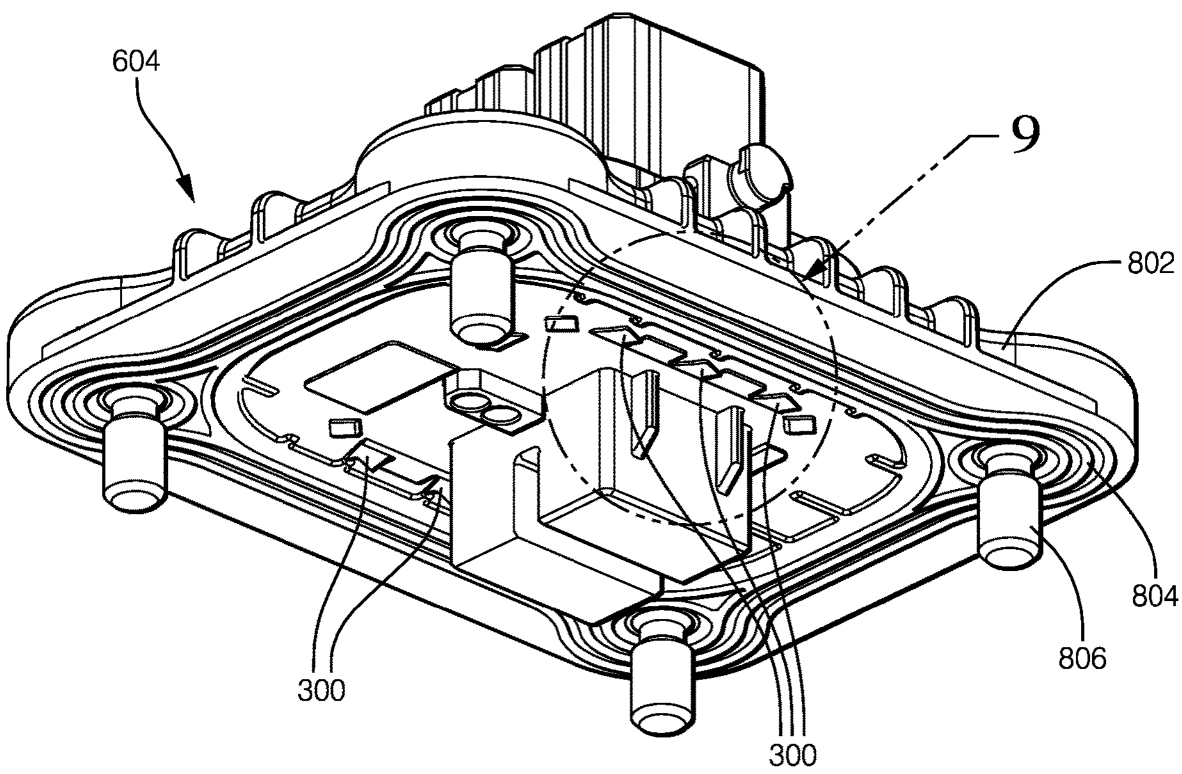
FIG. 8 illustrates a bottom isometric view of a connector header including the piercing contact of FIG. 3 according to some of the embodiments.
Figure 9:
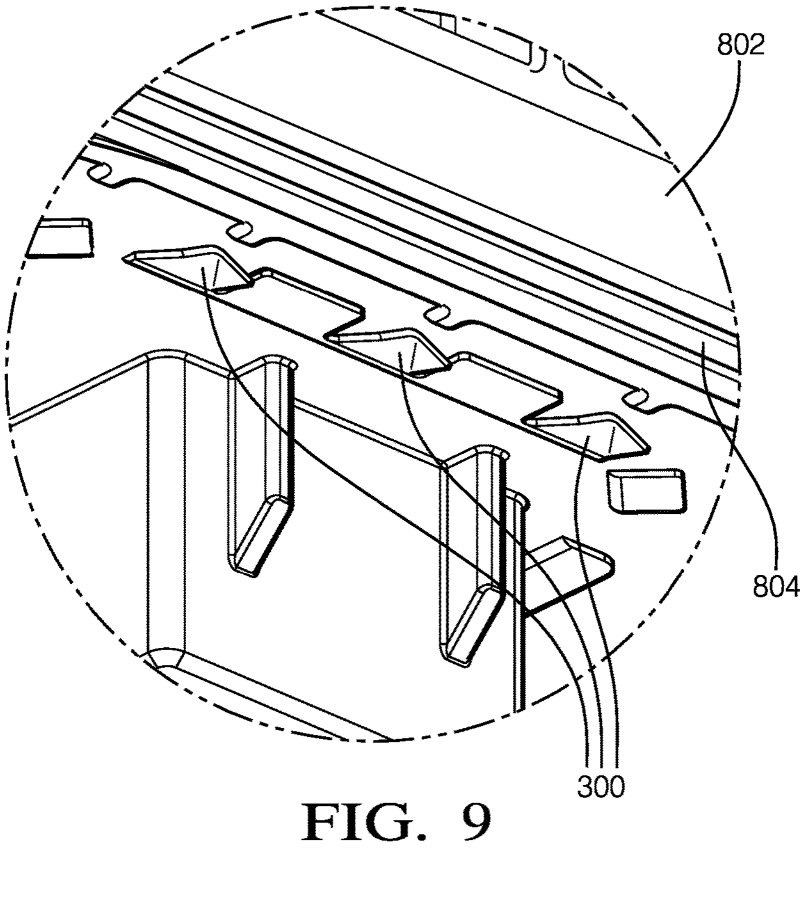
FIG. 9 illustrates a close-up bottom isometric view of the connector header of FIG. 8 according to some of the embodiments.

FIG. 8 and FIG. 9 illustrate a non-limiting example of the connector header 604. The connector header includes a non-conductive housing 802, the electrical shield 602 disposed within the housing 802, a complaint seal 804, and fasteners 806.

Figure 10:
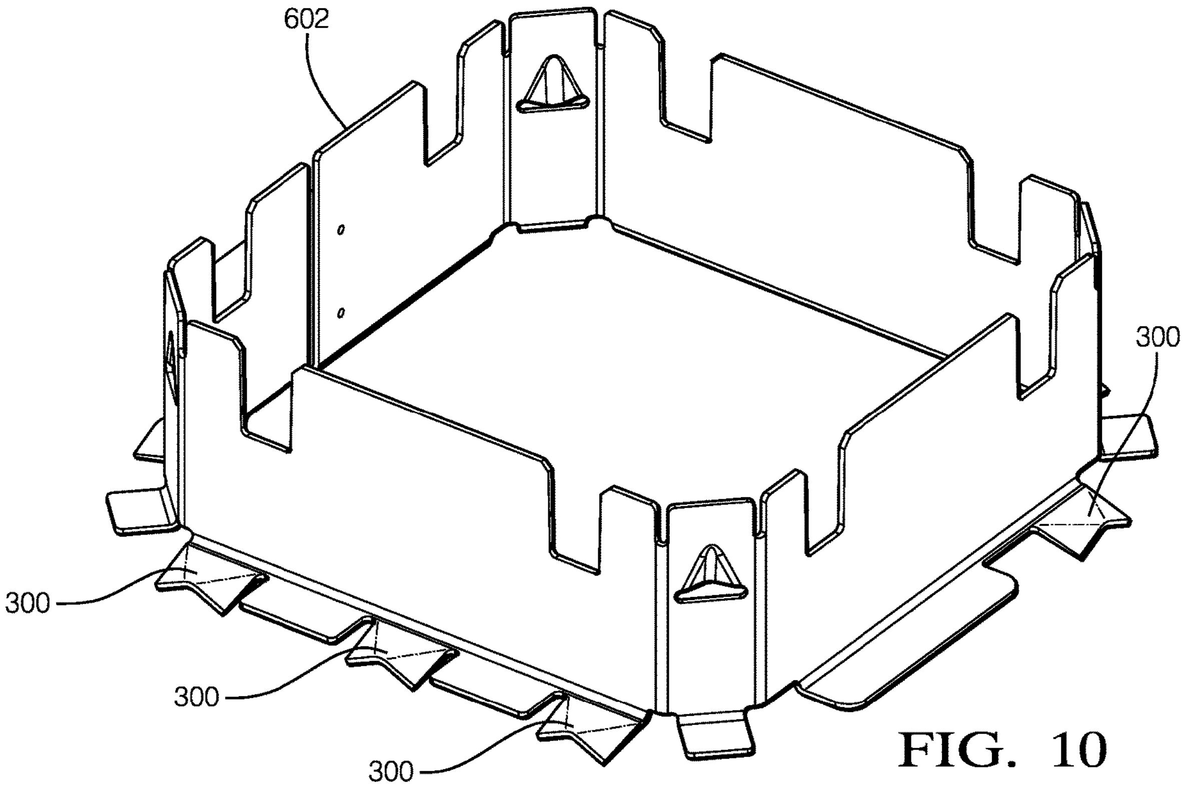
FIG. 10 illustrates a top isometric view of an electrical shield according to some of the embodiments.
Figure 11:
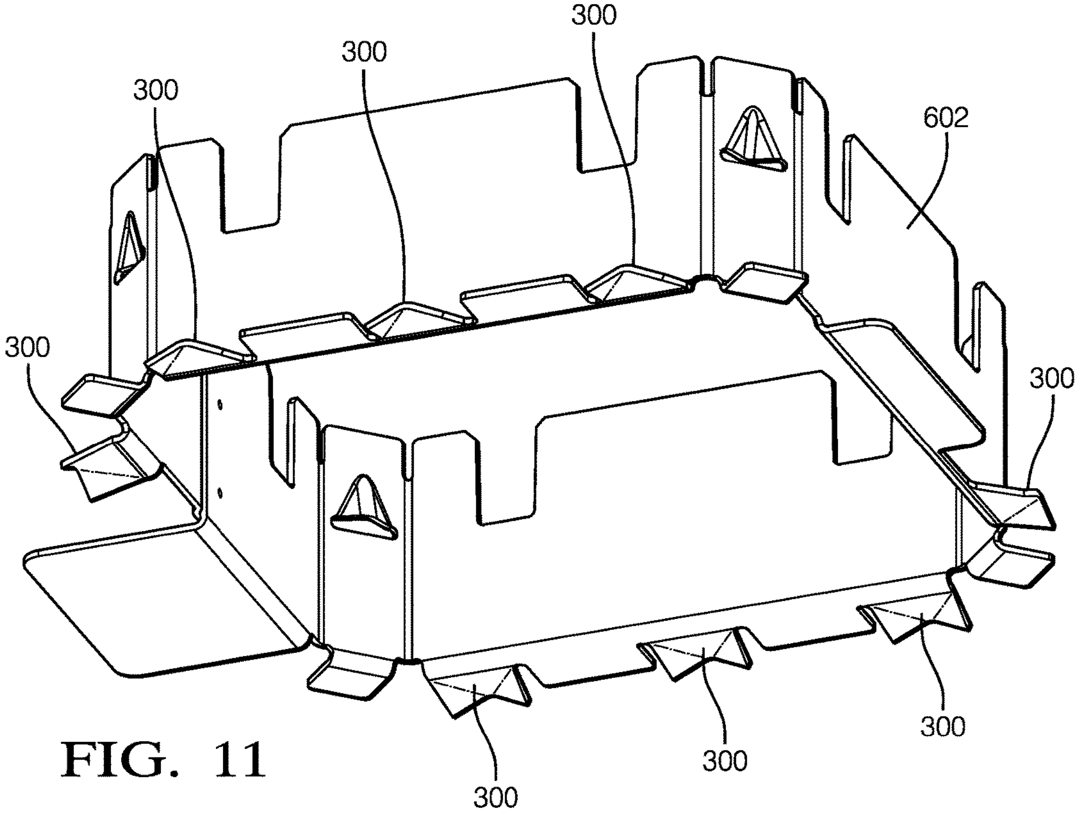
FIG. 11 illustrates a bottom isometric view of the electrical shield of FIG. 10 according to some of the embodiments.

As seen in FIG. 10 and FIG. 11, the electrical shield 602 defines a plurality of the contacts 300 extending from each side of the electrical shield 602 that are configured to scrape through the coating 608 on the coated metal substrate 606 on which the connector header 604 is mounted.

While the illustrated example shows the contact 300 integrated with the electrical shield 602, alternative embodiments may include this contact 300 integrated with other electrical elements, e.g., a grounding terminal electrically connected to a different coated metal substrate, e.g., a painted automobile body structure.

The contact 300 provides the benefit of producing clean and reliable connections directly from the electrical shield 602, or another electrical element incorporating the contact 300, to the coated metal substrate 606 without lateral forces being applied to the rest of the contact 300, thereby maximizing the scraping forces 704 caused by the clamping force 702 being applied to the apex of the contact 300 that is transmitted through the two triangular sections 304 to each of the two sharp points 302. This ensures that the two sharp points 302 will penetrate the coating 608 and provide the contact 300 with a robust and reliable electrically conductive path through the coating 608 to the metal substrate 606 beneath.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

a generally planar metallic substrate having a surface with an electrically nonconductive coating; and an electrical connector having a contact tab extending from a connector body, the contact tab being in mechanical and electrical contact with the metallic substrate, the contact tab forms a V-shaped configuration defining an apex and two non-coplanar triangular portions, each triangular portion terminating at a respective outwardly facing sharp point, a clamping force applied at the apex causes the sharp points to move laterally away from one another to scrape through the electrically nonconductive coating, thereby establishing electrical contact between the electrical connector and the metallic substrate.

2. The electrical connector assembly in accordance with claim 1, wherein the two triangular portions are arranged at an oblique angle to each other.

3. The electrical connector assembly in accordance with claim 2, wherein the two triangular portions are arranged symmetrically about a centerline of the contact tab.

4. The electrical connector assembly in accordance with claim 2, wherein the two triangular portions are formed by a V-shaped fold in the contact tab.

5. The electrical connector assembly in accordance with claim 4, wherein the connector body is attached to the metallic substrate and in contact with the apex of the V-shaped fold in the contact tab.

6. The electrical connector assembly in accordance with claim 5, wherein the clamping force applied to the apex of the V-shaped fold in the contact tab causes the two sharp points formed by the two triangular portions of the contact tab to move away from one another.

7. The electrical connector assembly in accordance with claim 5, wherein a clamping force applied to the apex of the V-shaped fold in the contact tab causes the two sharp points formed by the two triangular portions of the contact tab to move an equal distance from a centerline of the contact tab.

8. The electrical connector assembly in accordance with claim 1, wherein a contact force applied to the contact tab is evenly distributed to each of the two sharp points.

9. An electrical shield formed of sheet metal, comprising:

a contact tab extending from the electrical shield, the contact tab being in mechanical and configured to be in electrical contact with a metallic substrate, wherein the contact tab forms a V-shaped configuration defining an apex and two non-coplanar triangular portions, each triangular portion terminating at a respective outwardly facing sharp point, wherein a clamping force applied at the apex causes the sharp points to move laterally away from one another to scrape through an electrically nonconductive coating on a metallic substrate, thereby establishing electrical contact between the electrical shield and the metallic substrate.

10. The electrical shield in accordance with claim 9, wherein the two sharp points formed by the two triangular portions are arranged at an oblique angle to each other.

11. The electrical shield in accordance with claim 10, wherein the two triangular portions are arranged symmetrically about a centerline of the contact tab.

12. The electrical shield in accordance with claim 10, wherein the two triangular portions are formed by a V-shaped fold in the contact tab.

13. The electrical shield in accordance with claim 9, wherein a contact force applied to the contact tab is evenly distributed to each of the two sharp points.

14. A method of forming an electrical shield from sheet metal, comprising:

forming a rectangular contact tab extending from the electrical shield and integral to the electrical shield; and bending the contact tab at a centerline such that the contact tab defines a V-shaped configuration defining an apex and two non-coplanar triangular portions, each triangular portion terminating at a respective outwardly facing sharp point, the two sharp points are configured to pierce an electrically nonconductive coating on a metallic substrate applying a clamping force at the apex which causes the sharp points to move laterally away from one another to scrape through the electrically nonconductive coating, thereby establishing electrical contact between the electrical connector and the metallic substrate.

15. The method in accordance with claim 14, wherein the two triangular portions are arranged at an oblique angle to each other.

16. The method in accordance with claim 14, wherein the two triangular portions are arranged symmetrically about a centerline of the contact tab.

* * * * *